Jan. 16, 1968   R. D. FISCHER ETAL   3,363,412
SYSTEM FOR MAINTAINING TURBOCHARGER COMPRESSOR SPEED
Filed March 28, 1966

INVENTORS
ROBERT D. FISCHER
ARTHUR A. ZUHN
BY
ATTORNEYS

United States Patent Office 3,363,412
Patented Jan. 16, 1968

3,363,412
SYSTEM FOR MAINTAINING TURBOCHARGER COMPRESSOR SPEED
Robert D. Fischer, Peoria, and Arthur A. Zuhn, East Peoria, Ill., assignors to Caterpillar Tractor Co., Peoria, Ill., a corporation of California
Filed Mar. 28, 1966, Ser. No. 537,987
2 Claims. (Cl. 60—13)

ABSTRACT OF THE DISCLOSURE

A system for assisting a primary turbocharger driving means in maintaining a given compressor speed at low engine speed. A spool valve regulates flow of air from an air source to the compressor according to pressure in the intake manifold of the engine. The valve spool is of balanced construction so that its operation is a function of manifold pressure alone and is completely independent of air pressure in the source.

---

Figure 1:
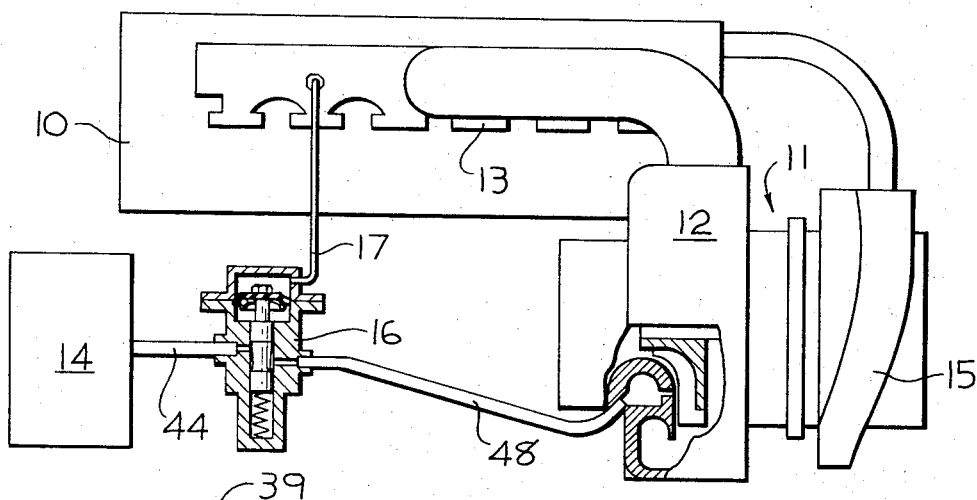

The broad concept of assisting a turbocharger by directing air under pressure onto the compressor wheel, as opposed to directing air into an engine manifold directly, is known in the art and set forth in some detail in R. F. Williams et al. Patent No. 3,190,068.

The systems to which the present invention relates comprise a turbocharger, the turbine of which is driven by the exhaust gases from an engine, and the compressor of which supplies air under pressure to the manifold of the engine. At low engine speeds, such as during idle, it is not uncommon for the exhaust gases from the engine to be insufficient to drive the turbine at the speed necessary for the compressor to supply enough air to meet the demands of the engine. In order to assist the compressor in providing the required air under these conditions, a high pressure air source (e.g. a receiver) is joined to the compressor wheel housing through a valve mechanism which, under prescribed conditions, allows the air from the source to impinge upon the compressor wheel, and thus assist it in maintaining the desired speed necessary to meet the air demanded by the engine. The most important component of such systems is the valve which determines when, and how much air is delivered from the source to the compressor wheel. It is this component to which the present invention is primarily directed.

Accordingly, it is an object of the present invention to provide a valve for a system for maintaining turbocharger compressor speed wherein the valve regulates the delivery of air from a source to a compressor wheel, and operates in response to and as a function of manifold pressure. In addition, it is an object to provide a valve as described above wherein the amount of air delivered from the source to the compressor is a function of the position of a valve spool in a valve bore, and the position of the valve spool is a function of the manifold pressure and completely independent of the pressure of the air in the source.

Further and more specific objects and advantages of the present invention are made apparent in the following specification wherein a preferred form of the invention is described by reference to the accompanying drawing.

Figure 2:
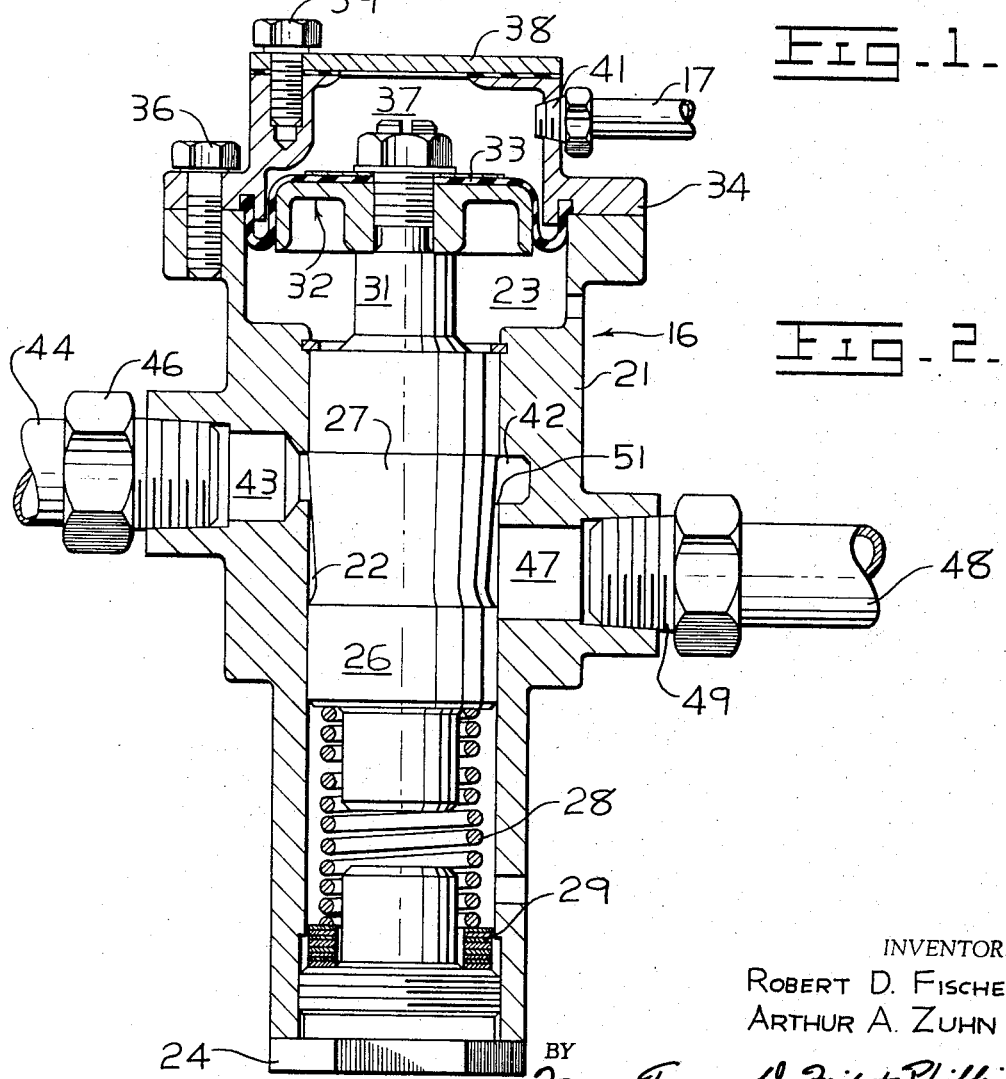

In the drawing:

FIG. 1 is a generally schematic illustration of a system for maintaining turbocharger compressor speed as taught by the present invention; and FIG. 2 is an enlarged sectional view of a valve which regulates the air delivered from a source of air pressure to the compressor in the system of FIG. 1.

Referring now to the drawing, a turbocharger 11 includes a compressor 12 which delivers air to a manifold 13 of an engine 10, and is driven by a turbine 15 which is driven by the exhaust of engine 10. The compressor 12 is connected to an independent source of air pressure 14 through a regulating valve 16. Valve 16 operates in response to and as a function of the pressure in manifold 13 by virtue of a connecting line 17 between the manifold and valve. When the pressure in manifold 13 drops below a predetermined pressure, the valve 16 communicates the source 14 with the compressor 12 whereby the turbocharger is assisted in supplying air to the manifold 13 making it possible for the turbocharger to maintain a desired pressure in the manifold in spite of the fact that the engine 10 is operating at low speed.

In order for the system to operate properly, it is essential that the valve 16 be sensitive to changes in manifold pressure, and, even more importantly, that the operation of the valve be independent of the particular pressure of the air in source 14. This latter requirement is important because of the fact that the pressure of source 14 may fluctuate significantly even under normal operating conditions.

The valve 16 includes a valve housing 21 which defines a central valve bore 22, one end of which opens up into an upper valve housing chamber 23, and the other end of which is closed by a threaded plug 24. Slidably disposed within the valve bore 2 is a valve spool 26 having a tapered mid-portion 27. One end of spool 26 is supported by a spring 28 which rests on a group of shims 29 disposed on the plug 24. By removing some of the shims 29 or adding additional shims, it is possible to determine the exact location of the spool 26 within the bore 22 for a given force in opposition to the spring 28.

The other end of spool 26 is joined through a connecting shaft 31 to a cup member 32 which is partially disposed within the upper valve housing chamber 23. The cup member 32 supports a flexible diaphragm 33 the periphery of which is sealed between the end of valve housing 21 and a valve housing cover 34; cover 34 being secured to the valve housing as by bolts 36 (one of which is shown). The space enclosed by the diaphragm 33 and valve housing cover 34 defines an upper pressure chamber 37 which is closed by a cap 38 and secured to the cover 34 as by bolts 39 (one of which is shown). The line 17, which communicates the valve 16 to the engine manifold 13, is joined, through an appropriate connector 41, to the upper pressure chamber 37 whereby changes in manifold pressure produce changes in the pressure in chamber 37. Thus, when the pressure in the manifold 13 decreases, the pressure in upper chamber 37 also decreases and the spring 28 is able to urge the valve spool 26 toward the cap 38. Conversely, when the pressure in upper chamber 37 increases in response to increased pressure in the manifold 13, the spool 26 moves in the direction of plug 24 against spring 28.

The valve bore 22 has an annular recess 42 formed in its surface, and the valve housing 21 includes a radial bore 43 which communicates the recess 42 with the exterior of the housing. A conduit 44 is connected to the bore 43, through an appropriate connector 46, and leads to the source 14 whereby communication is established between the source and bore 22 of valve 16.

The valve housing 21 includes a second radial bore 47 which communicates the valve bore 22 with the exterior of housing 21 whereby a conduit 48, joined to bore 47 through an appropriate connector 49, communicates the valve bore 22 with the compressor 12.

The tapered mid-portion 27 of valve spool 26 cooperates with the annular recess 42 in the surface of valve bore 22 to form an annular passage 51. The bore 43 and bore 47 are located on opposite sides of the passage 51 which puts the passage between the conduit 44 and the conduit 48. The size of the passage 51 is a function of the position of the valve spool 26. By a proper choice of shims 29 and spring 28, the valve spool 26 assumes a position within valve bore 22 which closes the passage 51 in response to manifold pressure above a pre-selected minimum pressure. Thus as long as the pressure in manifold 13 is above the minimum pressure, communication between the conduits 44 and 48 and thus between air source 14 and compressor 12 is prevented. As the pressure in manifold 13 drops below the predetermined minimum pressure the spring 28 urges the valve spool 26 toward the cap 38, which opens the passage 51, which enables air to pass across the bore 22 and into the bore 47 leading to the conduit 48. The size of the passage 51, and thus the rate of flow of air from source 14 to compressor 12 increases with decreasing manifold pressure (and thus decreasing pressure in chamber 37) such that the source 14 is able to accurately supply the compressor 12 with just that amount of assist air necessary to maintain a predetermined compressor speed, and thus a predetermined pressure in manifold 13.

Since the ability to maintain a predetermined pressure in manifold 13 depends on the ability to accurately position the valve spool 26 within the valve bore 22, it is apparent that any system which is sensitive to the pressure in source 14 will tend to produce a pressure in manifold 13 which fluctuates with changes in pressure in source 14. Since the pressure in source 14 can be expected to change from time to time, it is necessary if a stable system is to be achieved, that the valve 16 be independent of source pressure. By employing a tapered valve spool 26, the forces on spool 26 from source air pressure all have equal and opposite counterparts, whereby the position of valve spool 26 is independent of the pressure in source 14. This enables the pressure in manifold 13 to be maintained at a preselected minimum independently of the pressure in source 14 (as long as the pressure in source 14 is above that minimum pressure necessary to furnish compressor 12 with sufficient assist to achieve the desired manifold pressure).

The relatively simplified design of the valve employed in the system of the present invention produces a control which is extremely sensitive to manifold pressure and thus capable of maintaining the desired pressure in manifold 13 within a high degree of accuracy.

We claim:

1. In a system for maintaining the speed of a compressor forming part of a turbocharger which is driven by the exhaust gas of an engine the manifold of which receives air from the compressor the combination comprising:

a source of compressor air; and
valve means pneumatically disposed between said source and the compressor wherein said valve means comprises:
a valve housing having a valve bore formed therein; wherein said valve bore includes an annular recess;
a valve spool slidably disposed in said valve bore, said valve spool including a tapered mid-portion which cooperates with the valve bore recess to produce a variable area annular passage; said valve bore communicating with said source at one side of said annular passage and with the compressor at the other side of said passage, said source being isolated from the ends of said valve spool;
spring means associated with said valve spool urging said valve spool in one direction; and
means responsive to manifold pressure operable to urge said spool in opposition to said spring means with a force which is a function of manifold pressure.

2. The system of claim 1 wherein said last named means comprises:
a flexible diaphragm secured to said valve spool and forming one wall of a closed chamber; and
means communicating the engine manifold with the closed chamber whereby increases in engine manifold pressure displace said diaphragm which applies a force to said valve spool in opposition to said spring means.

References Cited

UNITED STATES PATENTS

| 1,211,636 | 1/1917 | Spray | 251—205 |
| 3,190,068 | 6/1965 | Williams | 60—13 |
| 3,241,804 | 3/1966 | Bjorklund | 251—61 |

FOREIGN PATENTS

| 613,973 | 2/1961 | Canada. |
| 793,307 | 4/1958 | Great Britain. |

CARLTON R. CROYLE, *Primary Examiner.*

MARK NEWMAN, *Examiner.*

D. HART, *Assistant Examiner.*